US009483141B2

(12) United States Patent
Hotelling et al.

(10) Patent No.: US 9,483,141 B2
(45) Date of Patent: Nov. 1, 2016

(54) SINGLE-CHIP MULTI-STIMULUS SENSOR CONTROLLER

(71) Applicant: Apple Inc., Cupertino, CA (US)

(72) Inventors: Steven P. Hotelling, Los Gatos, CA (US); Christoph H. Krah, Cupertino, CA (US); Marduke Yousefpor, San Jose, CA (US); Thomas James Wilson, Falmouth, ME (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/704,885

(22) Filed: May 5, 2015

(65) Prior Publication Data

US 2015/0234535 A1 Aug. 20, 2015

Related U.S. Application Data

(63) Continuation of application No. 14/056,841, filed on Oct. 17, 2013, now Pat. No. 9,069,408, which is a continuation of application No. 12/283,423, filed on Sep. 10, 2008, now Pat. No. 8,592,697.

(51) Int. Cl.

| | |
|---|---|
| ***G06F 3/041*** | (2006.01) |
| ***G09G 5/18*** | (2006.01) |
| ***G06F 3/044*** | (2006.01) |

(52) U.S. Cl.

CPC ............ *G06F 3/0416* (2013.01); *G06F 3/044* (2013.01); *G09G 5/18* (2013.01)

(58) Field of Classification Search

None

See application file for complete search history.

(56) References Cited

U.S. PATENT DOCUMENTS

| | | | |
|---|---|---|---|
| 4,444,998 | A | 4/1984 | House |
| 5,355,149 | A | 10/1994 | Casebolt |
| 5,483,261 | A | 1/1996 | Yasutake |
| 5,488,204 | A | 1/1996 | Mead et al. |
| 5,526,294 | A | 6/1996 | Ono et al. |
| 5,543,590 | A | 8/1996 | Gillespie et al. |
| 5,650,801 | A | 7/1997 | Higashi |
| 5,766,463 | A | 6/1998 | Janik et al. |

(Continued)

FOREIGN PATENT DOCUMENTS

| | | |
|---|---|---|
| JP | 2000-163031 A | 6/2000 |
| JP | 2002-342033 A | 11/2002 |

(Continued)

OTHER PUBLICATIONS

Final Office Action mailed Oct. 12, 2012, for U.S. Appl. No. 12/208,315, filed Sep. 10, 2008, 21 pages.

(Continued)

*Primary Examiner* — Kenneth B Lee, Jr.

(74) *Attorney, Agent, or Firm* — Morrison & Foerster LLP

(57) ABSTRACT

A multi-stimulus controller for a multi-touch sensor is formed on a single integrated circuit (single-chip). The multi-stimulus controller includes a transmit oscillator, a transmit signal section that generates a plurality of drive signals based on a frequency of the transmit oscillator, a plurality of transmit channels that transmit the drive signals simultaneously to drive the multi-touch sensor, a receive channel that receives a sense signal resulting from the driving of the multi-touch sensor, a receive oscillator, and a demodulation section that demodulates the received sense signal based on a frequency of the receive oscillator to obtain sensing results, the demodulation section including a demodulator and a vector operator.

20 Claims, 9 Drawing Sheets

(56) References Cited

U.S. PATENT DOCUMENTS

| | | | | |
|---|---|---|---|---|
| 5,816,225 | A | 10/1998 | Koch et al. | |
| 5,825,352 | A | 10/1998 | Bisset et al. | |
| 5,835,079 | A | 11/1998 | Shieh | |
| 5,880,411 | A | 3/1999 | Gillespie et al. | |
| 5,920,309 | A | 7/1999 | Bisset et al. | |
| 6,075,520 | A | 6/2000 | Inoue et al. | |
| 6,188,391 | B1 | 2/2001 | Seely et al. | |
| 6,310,610 | B1 | 10/2001 | Beaton et al. | |
| 6,323,846 | B1 | 11/2001 | Westerman et al. | |
| 6,327,011 | B2 | 12/2001 | Kim | |
| 6,690,387 | B2 | 2/2004 | Zimmerman et al. | |
| 6,816,750 | B1 | 11/2004 | Klaas | |
| 7,015,894 | B2 | 3/2006 | Morohoshi | |
| 7,184,064 | B2 | 2/2007 | Zimmerman et al. | |
| 7,289,142 | B2 | 10/2007 | Silverbrook | |
| 7,362,313 | B2 | 4/2008 | Geaghan et al. | |
| 7,643,011 | B2 | 1/2010 | O'Connor et al. | |
| 7,663,607 | B2 | 2/2010 | Hotelling et al. | |
| 8,026,904 | B2 | 9/2011 | Westerman | |
| 8,237,667 | B2 * | 8/2012 | Krah | G06F 3/0416 329/304 |
| 8,479,122 | B2 | 7/2013 | Hotelling et al. | |
| 8,592,697 | B2 | 11/2013 | Hotelling et al. | |
| 8,593,423 | B2 | 11/2013 | Hotelling et al. | |
| 8,791,920 | B2 | 7/2014 | Krah | |
| 8,988,390 | B1 | 3/2015 | Krah et al. | |
| 9,069,408 | B2 | 6/2015 | Hotelling et al. | |
| 9,086,750 | B2 | 7/2015 | Krah | |
| 9,348,451 | B2 | 5/2016 | Wilson et al. | |
| 2002/0067845 | A1 | 6/2002 | Griffis | |
| 2003/0132922 | A1 | 7/2003 | Philipp | |
| 2004/0056845 | A1 | 3/2004 | Harkcom et al. | |
| 2004/0183833 | A1 | 9/2004 | Chua | |
| 2006/0114650 | A1 | 6/2006 | Wang et al. | |
| 2006/0132462 | A1 | 6/2006 | Geaghan | |
| 2006/0197753 | A1 | 9/2006 | Hotelling | |
| 2007/0109274 | A1 | 5/2007 | Reynolds | |
| 2007/0268272 | A1 | 11/2007 | Perski et al. | |
| 2007/0273663 | A1 | 11/2007 | Park et al. | |
| 2008/0157867 | A1 | 7/2008 | Krah | |
| 2008/0157893 | A1 | 7/2008 | Krah | |
| 2008/0158172 | A1 | 7/2008 | Hotelling et al. | |
| 2008/0158184 | A1 | 7/2008 | Land et al. | |
| 2008/0165203 | A1 | 7/2008 | Pantfoerder | |
| 2008/0309625 | A1 | 12/2008 | Krah et al. | |
| 2008/0309628 | A1 | 12/2008 | Krah et al. | |
| 2009/0009483 | A1 | 1/2009 | Hotelling et al. | |
| 2009/0189867 | A1 | 7/2009 | Krah et al. | |
| 2009/0314621 | A1 | 12/2009 | Hotelling | |
| 2010/0059295 | A1 | 3/2010 | Hotelling et al. | |
| 2010/0060589 | A1 | 3/2010 | Wilson | |
| 2010/0060590 | A1 | 3/2010 | Wilson et al. | |
| 2010/0060593 | A1 | 3/2010 | Krah | |
| 2014/0022203 | A1 | 1/2014 | Karpin et al. | |
| 2014/0043293 | A1 | 2/2014 | Hotelling | |
| 2014/0306913 | A1 | 10/2014 | Krah | |

FOREIGN PATENT DOCUMENTS

| | | | |
|---|---|---|---|
| WO | WO-98/07127 | A1 | 2/1998 |
| WO | WO-2008/085719 | A2 | 7/2008 |
| WO | WO-2010/030706 | A1 | 3/2010 |
| WO | WO-2010/030709 | A1 | 3/2010 |

OTHER PUBLICATIONS

Final Office Action mailed Dec. 5, 2013, for U.S. Appl. No. 12/208,315, filed Sep. 10, 2008, 22 pages.

Final Office Action mailed Oct. 7, 2014, for U.S. Appl. No. 12/208,315, filed Sep. 10, 2008, 28 pages.

Final Office Action mailed Dec. 24, 2015, for U.S. Appl. No. 12/208,315, filed Sep. 10, 2008, 28 pages.

Non-Final Office Action mailed Dec. 19, 2011, for U.S. Appl. No. 12/208,315, filed Sep. 10, 2008, 21 pages.

Non-Final Office Action mailed Apr. 30, 2013, for U.S. Appl. No. 12/208,315, filed Sep. 10, 2008, 21 pages.

Non-Final Office Action mailed Mar. 14, 2014, for U.S. Appl. No. 12/208,315, filed Sep. 10, 2008, 25 pages.

Non-Final Office Action mailed May 14, 2015, for U.S. Appl. No. 12/208,315, filed Sep. 10, 2008, 25 pages.

Non-Final Office Action mailed Dec. 14, 2015, for U.S. Appl. No. 12/208,329, filed Sep. 10, 2008, 14 pages.

Notice of Allowance mailed Mar. 14, 2016, for U.S. Appl. No. 12/208,315, filed Sep. 10, 2008, 12 pages.

Notice of Allowance mailed May 18, 2015, for U.S. Appl. No. 14/315,162, filed Jun. 25, 2014, eight pages.

Fakatselis, J. (Aug. 1996). "Processing Gain for Direct Sequence Spread Spectrum Communication Systems and PRISM®," Application Note AN9633, Intersil, four pages.

Final Office Action mailed Aug. 17, 2012, for U.S. Appl. No. 13/250,984, filed Sep. 30, 2011, 14 pages.

Final Office Action mailed Aug. 28, 2012, for U.S. Appl. No. 12/283,423, filed Sep. 10, 2008, nine pages.

Final Office Action mailed Dec. 30, 2013, for U.S. Appl. No. 12/208,329, filed Sep. 10, 2008, 12 pages.

Final Office Action mailed Feb. 26, 2015, for U.S. Appl. No. 12/208,329, filed Sep. 10, 2008, 13 pages.

International Search Report mailed Dec. 21, 2009, for PCT Application No. PCT/US2009/056413, filed Sep. 9, 2009, three pages.

International Search Report mailed Dec. 22, 2009, for PCT Application No. PCT/US2009/056410, filed Sep. 9, 2009, three pages.

Lee, S.K. et al. (Apr. 1985). "A Multi-Touch Three Dimensional Touch-Sensitive Tablet," Proceedings of CHI: ACM Conference on Human Factors in Computing Systems, pp. 21-25.

Non-Final Office Action mailed May 20, 2011, for U.S. Appl. No. 12/283,435, filed Sep. 10, 2008, six pages.

Non-Final Office Action mailed Nov. 7, 2011, for U.S. Appl. No. 13/250,984, filed Sep. 30, 2011, nine pages.

Non-Final Office Action mailed Nov. 17, 2011, for U.S. Appl. No. 12/283,423, filed Sep. 10, 2008, nine pages.

Non-Final Office Action mailed Nov. 25, 2011, for U.S. Appl. No. 12/208,329, filed Sep. 10, 2008, 31 pages.

Non-Final Office Action mailed Apr. 13, 2012, for U.S. Appl. No. 13/250,984, filed Sep. 30, 2011, 14 pages.

Non-Final Office Action mailed Sep. 28, 2012, for U.S. Appl. No. 12/208,329, filed Sep. 10, 2008, 33 pages.

Non-Final Office Action mailed Oct. 5, 2012, for U.S. Appl. No. 13/568,027, filed Aug. 6, 2012, six pages.

Non-Final Office Action mailed Dec. 7, 2012, for U.S. Appl. No. 13/250,984, filed Sep. 30, 2011, 10 pages.

Non-Final Office Action mailed Apr. 23, 2013, for U.S. Appl. No. 13/568,027, filed Aug. 6, 2012, 8 pages.

Non-Final Office Action mailed Aug. 29, 2013, for U.S. Appl. No. 12/208,329, filed Sep. 10, 2008, 13 pages.

Non-Final Office Action mailed May 13, 2014, for U.S. Appl. No. 14/056,841, filed Oct. 17, 2013, seven pages.

Non-Final Office Action mailed Jun. 6, 2014, for U.S. Appl. No. 12/208,329, filed Sep. 10, 2008, 12 pages.

Non-Final Office Action mailed Sep. 29, 2014, for U.S. Appl. No. 14/315,162, filed Jun. 25, 2014, seven pages.

Notice of Allowance mailed Apr. 5, 2012, for U.S. Appl. No. 12/283,435, filed Sep. 10, 2008, seven pages.

Notice of Allowance mailed Mar. 21, 2013, for U.S. Appl. No. 12/208,329, filed Sep. 10, 2008, 14 pages.

Notice of Allowance mailed May 23, 2013, for U.S. Appl. No. 13/250,984, filed Sep. 30, 2011, 10 pages.

Notice of Allowance mailed Aug. 23, 2013, for U.S. Appl. No. 13/250,984, filed Sep. 30, 2011, 10 pages.

Notice of Allowance mailed Aug. 29, 2013, for U.S. Appl. No. 12/283,423, filed Sep. 10, 2008, eight pages.

Notice of Allowance mailed Nov. 25, 2013, for U.S. Appl. No. 13/568,027, filed Aug. 6, 2012, nine pages.

Notice of Allowance mailed Mar. 11, 2014, for U.S. Appl. No. 13/568,027, filed Aug. 6, 2012, eight pages.

Notice of Allowance mailed Dec. 3, 2014, for U.S. Appl. No. 13/935,333, filed Jul. 3, 2013, nine pages.

(56) References Cited

OTHER PUBLICATIONS

Notice of Allowance mailed Jan. 15, 2015, for U.S. Appl. No. 14/056,841, filed Oct. 17, 2013, ten pages.
Notice of Allowance (corrected) mailed Mar. 19, 2015, for U.S. Appl. No. 14/056,841, filed Oct. 17, 2013, 7 pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

Phase 1: $\int(a\cdot0.5\cdot(\cos(\phi)-\cos(2\cdot\omega\cdot t+\phi)))dt = a\cdot0.5\cdot\cos(\phi)$ Phase 2: $\int(a\cdot0.5\cdot(\cos(180+\phi)-\cos(2\cdot\omega\cdot t+180+\phi)))dt = a\cdot0.5\cdot\cos(180+\phi)$

SINGLE-CHIP MULTI-STIMULUS SENSOR CONTROLLER

CROSS-REFERENCE TO RELATED APPLICATIONS

This application is a continuation application of U.S. patent application Ser. No. 14/056,841, filed Oct. 17, 2013, which claims the benefit of U.S. application Ser. No. 12/283,423, filed Sep. 10, 2008, (U.S. Pat. No. 8,592,697, issued Nov. 26, 2013) each of which is hereby incorporated by reference in its entirety.

FIELD OF THE INVENTION

This relates generally to controllers for multi-stimulus sensors, and in particular, to single-chip controllers for multi-stimulus touch sensors.

BACKGROUND OF THE INVENTION

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Mutual capacitance touch sensor panels can be formed from a matrix of drive and sense lines of a substantially transparent conductive material such as Indium Tim Oxide (ITO), often arranged in rows and columns in horizontal and vertical directions on a substantially transparent substrate. Drive signals can be transmitted through the drive lines, resulting in signal capacitances at the crossover points (sensing pixels) of the drive lines and the sense lines. The signal capacitances can be determined from sense signals that are generated in the sense lines due to the drive signals. In some touch sensor panel systems, multiple drive lines are stimulated simultaneously to generate composite sense signals in the sense lines. While these systems offer some advantages, conventional multi-stim systems can be inflexible because their design typically limits the operation of the system to a specific stimulation scenario. For example, a typical multi-stim system must use specific combinations of drive signals to generate specific sense signals, and must extract the signal capacitance from the sense signals in a specific manner.

SUMMARY OF THE INVENTION

In view of the foregoing, a multi-stimulus controller for a multi-touch sensor is formed on a single integrated circuit (single-chip) to include a transmit oscillator, a transmit signal section that generates a plurality of drive signals based on a frequency of the transmit oscillator, a plurality of transmit channels that transmit the drive signals simultaneously to drive the multi-touch sensor, a receive channel that receives a sense signal resulting from the driving of the multi-touch sensor, a receive oscillator, and a demodulation section that demodulates the received sense signal based on a frequency of the receive oscillator to obtain sensing results, the demodulation section including a demodulator and a vector operator. Such an implementation may provide a more flexible system than conventional designs. For example, the vector operation can allow for selection and testing of arbitrary vectors, allowing system designers to test and implement different stimulation matrix/decode matrix combinations, for example, without the need to extensive redesign of the sensing system.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to a multi-stimulus controller for a multi-touch sensor that is formed on a single integrated circuit (single-chip). The controller includes a receive section, a multistage vector demodulation engine, a transmit section, and various peripherals, such as memory, logic, interfaces, signal generators, processors, etc. The multi-stimulus controller can drive a sensor, such as a touch sensor panel, using multiple, simultaneous drive signals, and can receive sense signals from the sensor that result from the multiple stimuli. The sense signals received by the multi-stimulus controller can be composite signals that are formed of a superposition of multiple component sense signals, each component signal resulting from a drive signal, and each component signal carrying measurement data. The multi-stimulus controller can demodulate and decode multiple composite signals to extract the individual measurement data carried by the component signals.

Although embodiments of the invention may be described and illustrated herein in terms of mutual capacitance touch sensor panels, it should be understood that embodiments of this invention are not so limited, but are additionally applicable to self-capacitance sensor panels, and both single and multi-touch sensor panels, and other sensors, in which multiple simultaneous stimulation signals are used to generate a composite sense signal. Furthermore, although embodiments of the invention may be described and illustrated herein in terms of double-sided ITO (DITO) touch sensor panels, it should be understood that embodiments of the invention are also applicable to other touch sensor panel configurations, such as configurations in which the drive and sense lines are formed on different substrates or on the back of a cover glass, and configurations in which the drive and sense lines are formed on the same side of a single substrate.

Figure 1:
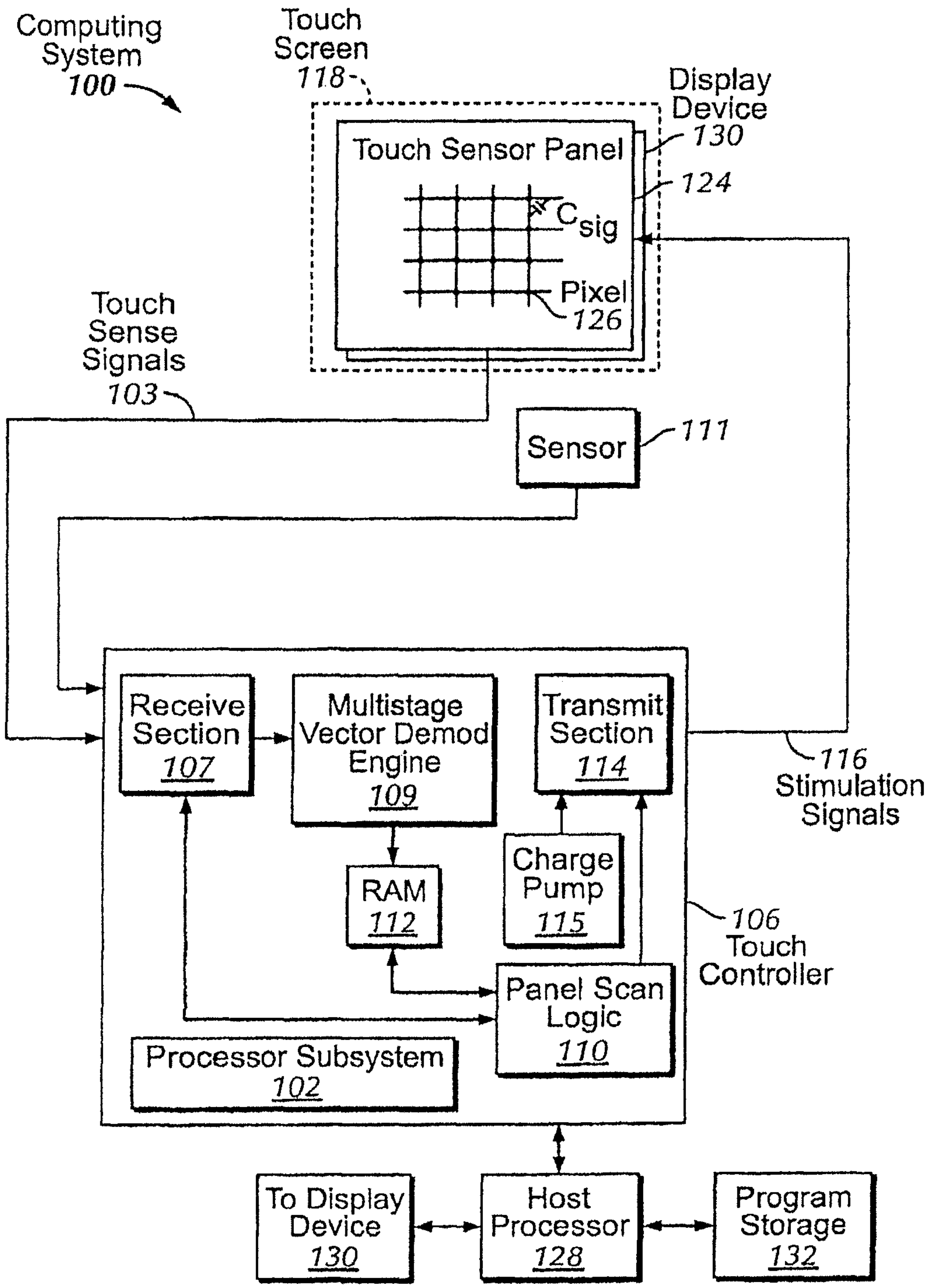
FIG. 1 illustrates an example computing system according to embodiments of the invention.

FIG. 1 illustrates example computing system 100 that utilizes a single-ASIC multi-touch controller 106 with integrated drive system according to embodiments of the invention. Touch controller 106 is a single application specific integrated circuit (ASIC) that can include one or more processor subsystems 102, which can include, for example, one or more main processors, such as ARM968 processors or other processors with similar functionality and capabilities. However, in other embodiments, the processor functionality can be implemented instead by dedicated logic, such as a state machine. Processor subsystems 102 can also include, for example, peripherals (not shown) such as random access memory (RAM) or other types of memory or storage, watchdog timers and the like. Touch controller 106 can also include, for example, a receive section 107 for receiving signals, such as touch sense signals 103 of one or more sense channels (not shown), other signals from other sensors such as sensor 111, etc. Touch controller 106 can also include, for example, a demodulation section such as multistage vector demod engine 109, panel scan logic 110, and a drive system including, for example, a transmit section 114. Panel scan logic 110 can access RAM 112, autonomously read data from the sense channels and provide control for the sense channels. In addition, panel scan logic 110 can control transmit section 114 to generate stimulation signals 116 at various frequencies and phases that can be selectively applied to rows of a touch sensor panel 124.

A charge pump 115 can be used to generate the supply voltage for the transmit section. The stimulation signals 116 (Vstim) that can have amplitudes higher than the maximum voltage the ASIC process can tolerate by cascoding transistors. Therefore, the stimulus voltage can be higher (e.g. 6 V) than the voltage level a single transistor can handle (e.g. 3.6 V). Although FIG. 1 shows charge pump 115 separate from transmit section 114, the charge pump can be part of the transmit section.

Touch sensor panel 124 can include a capacitive sensing medium having a plurality of row traces (e.g., drive lines) and a plurality of column traces (e.g., sense lines), although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms “row” and “column,” “first dimension” and “second dimension,” or “first axis” and “second axis” as used herein are intended to encompass not only orthogonal grids, but the intersecting traces of other geometric configurations having first and second dimensions (e.g. the concentric and radial lines of a polar-coordinate arrangement). The rows and columns can be formed on, for example, a single side of a substantially transparent substrate separated by a substantially transparent dielectric material, on opposite sides of the substrate, on two separate substrates separated by the dielectric material, etc.

At the “intersections” of the traces, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 126, which can be particularly useful when touch sensor panel 124 is viewed as capturing an “image” of touch. (In other words, after touch controller 106 has determined whether a touch event has been detected at each touch sensor in the touch sensor panel, the pattern of touch sensors in the multi-touch panel at which a touch event occurred can be viewed as an “image” of touch (e.g. a pattern of fingers touching the panel).) The capacitance between row and column electrodes appears as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig.

Computing system 100 can also include host processor 128 for receiving outputs from processor subsystems 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user’s preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device. In some embodiments, host processor 128 can be a separate component from touch controller 106, as shown. In other embodiments, host processor 128 can be included as part of touch controller 106. In still other embodiments, the functions of host processor 128 can be performed by processor subsystem 102 and/or distributed among other components of touch controller 106. Display device 130 together with touch sensor panel 124, when located partially or entirely under the touch sensor panel, can form touch screen 118.

Note that one or more of the functions described above can be performed, for example, by firmware stored in memory (e.g., one of the peripherals) and executed by processor subsystem 102, or stored in program storage 132 and executed by host processor 128. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2A:
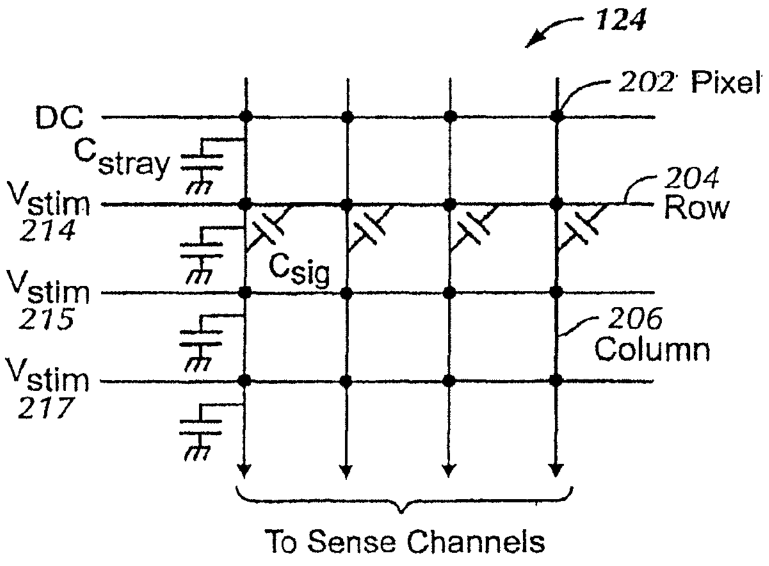
FIG. 2*a* illustrates an exemplary mutual capacitance touch sensor panel according to one embodiment of this invention.

FIG. 2*a* is a partial view of example touch sensor panel 124 that shows more detail according to embodiments of the invention. FIG. 2*a* indicates the presence of a stray capacitance Cstray at each pixel 202 located at the intersection of a row 204 and a column 206 trace (although Cstray for only one column is illustrated in FIG. 2*a* for purposes of simplifying the figure). In the example of FIG. 2*a*, drive signals transmitted by transmit section 114 can be applied to the rows of touch panel. For example, AC stimulus Vstim 214, Vstim 215 and Vstim 217 can be applied to several rows, while other rows can be connected to DC. Vstim 214, Vstim 215 and Vstim 217 can be, for example, signals having different phases, as will be explained later. Each stimulation signal on a row can cause a charge Qsig to be injected into the columns through the mutual capacitance present at the affected pixels, where:

$$Qsig = Csig \times Vstim \qquad (1)$$

A change in the injected charge (Qsig_sense) can be detected when a finger, palm or other object is present at one or more of the affected pixels. Vstim signals 214, 215 and 217 can include one or more bursts of sine waves, square waves, etc. Vstim signals could be comprised of signals with one specific phase, amplitude and frequency but could be composite in nature, e.g. can be comprised of multiple signals, each having a specific phase, amplitude and frequency. Each signal component could be frequency, phase or amplitude modulated. For example, amplitude modulation can be used for windowing purposes to provide a stimulus signal that is narrow band and has little harmonic content as to prevent unwanted noise sources to enter the receive channel. For example, having a stimulus signal with a square wave-shape has higher order harmonics. These higher order harmonics may cause in band noise components due to intermodulation between external noise components with the higher order harmonics of the stimulus. Note that although FIG. 2*a* illustrates rows 204 and columns 206 as being substantially perpendicular, they need not be so aligned, as described above. Each column 206 can be connected to a sense channel, for example.

Figure 2B:
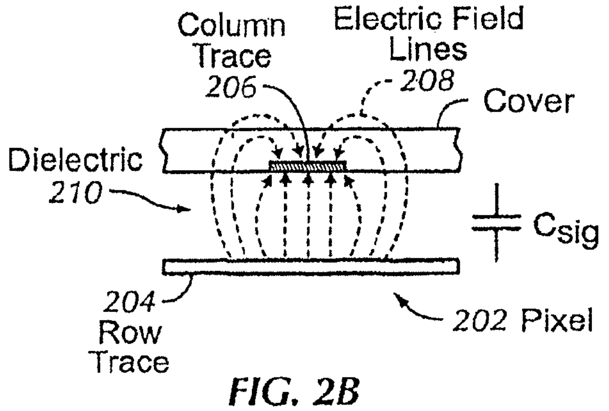
FIG. 2*b* is a side view of an exemplary pixel in a steady-state (no-touch) condition according to one embodiment of this invention.

FIG. 2*b* is a side view of example pixel 202 in a steady-state (no-touch) condition according to embodiments of the invention. In FIG. 2*b*, an electric field of electric field lines 208 of the mutual capacitance between column 206 and row 204 traces or electrodes separated by dielectric 210 is shown.

Figure 2C:
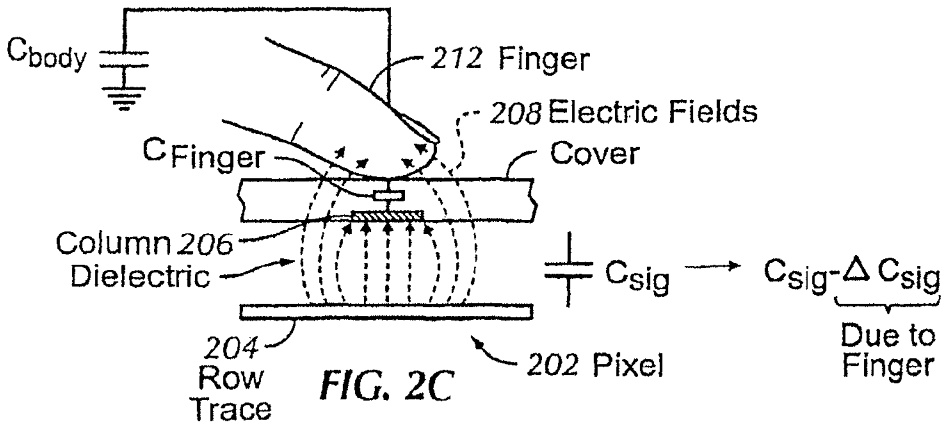
FIG. 2*c* is a side view of an exemplary pixel in a dynamic (touch) condition according to one embodiment of this invention.

FIG. 2*c* is a side view of example pixel 202 in a dynamic (touch) condition. In FIG. 2*c*, finger 212 has been placed near pixel 202. Finger 212 is a low-impedance object at signal frequencies, and has an AC capacitance Cfinger from the column trace 206 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (e.g., a range from "no-touch" to "full-touch").

Figure 3:
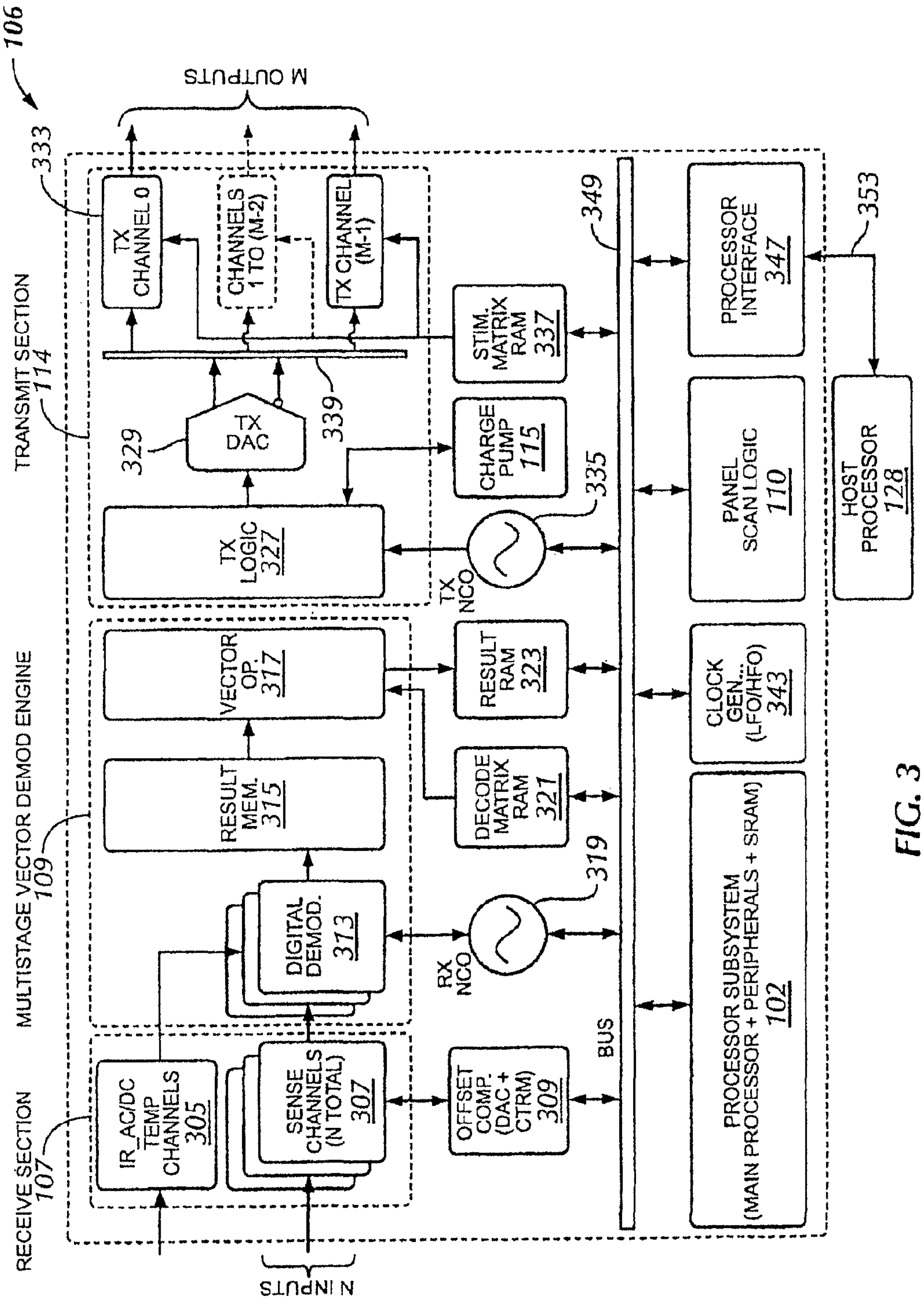
FIG. 3 illustrates an example application specific integrated circuit (ASIC) single chip multi-touch controller according to embodiments of the invention.

FIG. 3 is a more detailed block diagram of example single-ASIC multi-touch controller 106 according to embodiments of the invention. Receive (RX) section 107 of touch controller 106 includes miscellaneous channels 305

(e.g., channels for infrared sensors, temperature sensors, etc.) and a total of N receive channels, such as sense channels 307. Sense channels 307 are connected to an offset compensator 309. Multistage vector demodulation engine 109 includes a digital demodulation section 313, a result memory 315, and a vector operator 317. Digital demodulation section 313 is connected to a receive NCO 319, and vector operator 317 is connected to a decode matrix RAM 321 and connected to a result RAM 323. Transmit (TX) section 114 includes a transmit logic 327, a transmit DAC 329, and a total of M transmit channels 333. Transmit NCO 335 provides a clock to transmit logic and TX DAC and charge pump 115 provides power to the transmit channels. Transmit channels 333 are connected to a stimulation matrix RAM 337 via an analog bus 339. Decode matrix RAM 321, result RAM 323, and stimulation matrix RAM 337 could be, for example, part of RAM 112. Processor subsystem 102 can store and update, for example, a decode matrix in decode matrix RAM 321 and a stimulation matrix in stimulation matrix RAM 337, initialize the multi-touch subsystem, process data from the receive channels and facilitate communications with the host processor.

FIG. 3 shows processor subsystem 102, panel scan logic 110, and host processor 128. FIG. 3 also shows a clock generator 343 and a processor interface 347. Various components of touch controller 106 are connected together via a peripheral bus 349. Processor interface 347 is connected to host processor 128 via a processor interface (PI) connection 353.

Figure 4:
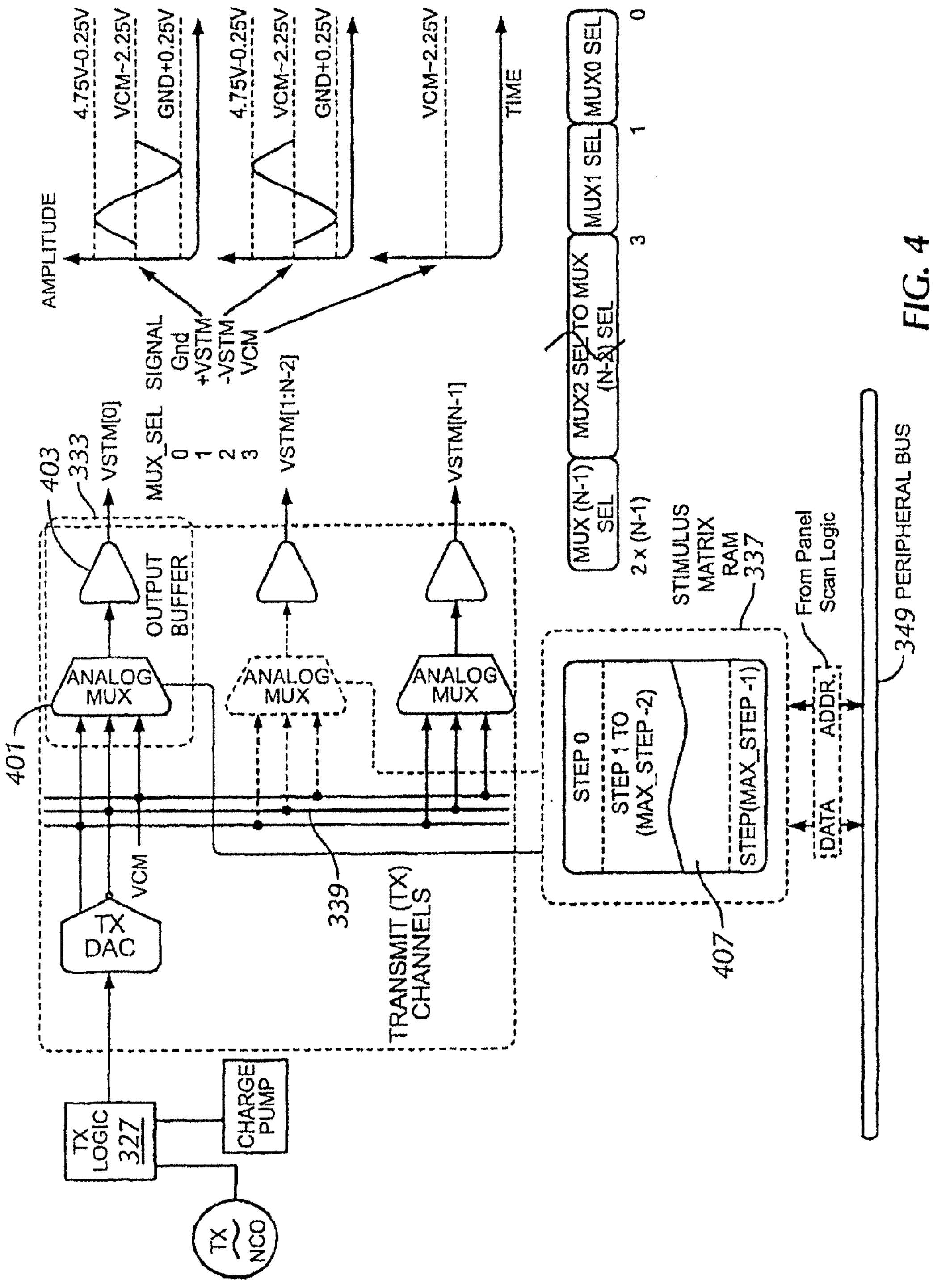
FIG. 4 illustrates an example transmit channel according to embodiments of the invention.

An example drive signal transmission operation of touch controller 106 according to embodiments of the invention will now be described with reference to FIG. 4, which is a block diagram showing more details of touch controller 106. Transmit logic 327, which is powered by charge pump 115, generates digital signals based on TX NCO 335. TX DAC 329 is a differential DAC and converts the digital signals from transmit logic 327 into stimulation signals Vstim+ and Vstim-. Vstim+ is a signal having a waveform at the same frequency as TX NCO 335, and Vstim− is a signal with the waveform of Vstim+ that is inverted about a common voltage Vcm. In this example, the common voltage, Vcm, is equal to 2.5 V. Vstim+ is a sine wave of frequency ω having a DC offset of 2.5 V and a maximum amplitude of 4.75 V:

$$Vstim+=2.5V+2.25V*\sin(\omega t)$$

Vstim− a sine wave of frequency ω with a DC offset of 2.25 V and a maximum amplitude of 4.75 V, that is out of phase with Vstim+ by 180 degrees:

$$Vstim-=2.5\ V+2.25V*\sin(\omega t+)180^\circ$$

Of course, other stimulation signals and signal generation methods could be used. For example, TX NCO 335 could include a mixer to mix the sine wave Vstim+ and Vstim-signals above with an envelope waveform generated from an envelope look-up-table (LUT). The envelope shaping/windowing capability can be beneficial in that it allows the control the spectral properties of the stimulus waveform and also how much energy is put into the multi-touch panel. Both of these properties control the amount of interference rejection. The more energy is put into the panel the better the interference rejection toward external interferers. Examples of windowing functions are Gaussian, Chebychev or Rectangular. Using, for example, a Chebychev window vs. Rectangular window results in a stimulus waveform that, in the frequency domain, has reduced sideband ripple and therefore allows less noise to enter the receive channel post demodulation.

TX DAC 329 supplies Vstim+ and Vstim- to separate lines of analog bus 339. Bus 339 also includes a line carrying the common voltage, Vcm, and a line that is grounded, gnd. Each transmit channel 333 includes an analog MUX 401 and buffer 403. Analog MUX 401 is connected to each line of bus 339, and can select one of the drive signals, Vstim+, Vstim-, Vcm, or gnd to supply to buffer 403. The use of a single TX DAC 329 together with analog bus 339 and multiple MUXs 401 (one for each transmit channel) can allow for a reduced footprint on chip versus other designs, while allowing stimulation signals of different phases to be generated. However, more than one TX DAC 329 could be used. TX DAC 329 can be, for example, an R2-R DAC, a thermometer coded DAC, a sigma-delta DAC, or other type of DAC. MUX 401 selects a drive signal based on a stimulation matrix 407 stored in stimulation matrix RAM 337, as described in more detail below. The buffers 403 of the transmit channels 333 may have a gain of 1 (unity) or a gain higher than 1 dependent on the maximum stimulus voltage level at the output of the TX DAC. Therefore, the buffers may serve the purpose of not only gaining up the signal from the TX DAC but also to provide the drive capability to drive the mostly capacitive load presented to them by the multi-touch sensor panel 124.

Output buffer 403 can provide the benefit of preventing the noise present on the charge pump supply to propagate to the VSTM outputs. This is important as to prevent any unwanted noise on the VSTM ports generated by the charge-pump to reduce the signal-to-noise ratio and inadvertently to affect the touch-performance. In other words, buffers 403 are essentially self-regulating because each has negative feedback. The power supply ripple rejection of the output buffers 403 can suffice to suppress any power supply ripple present on the charge pump supply. In some embodiments, using buffer 403 in transmit section 114 may provide enough power supply ripple rejection to allow the use of an unregulated charge pump. This can allow the design of the charge pump to be simpler and more efficient. Furthermore the charge-pump operating frequency can selected either as a function of the stimulus frequency or outside the stimulus frequency range to prevent charge-pump introduced noise to affect the touch performance.

During each step of a multi-step scan of touch sensor panel 124, each MUX 401 selects one of Vstim+, Vstim-, Vcm, or GND for transmission to a corresponding drive line of the touch sensor panel. GND can be used to put the corresponding output buffer into a low power state to conserve power if that buffer is not used. The selection is made based on stim matrix 407. As shown in FIG. 4, each row of stim matrix 407 correspond to one step in the scan, and the data values in a row specify the selections of drive signals for each TX channel 333. For each step in the scan, the MUXs 401 select drive signals based on the data values in a row of stim matrix 407. For example, in the first step, the STEP 0 row in FIG. 4 specifies a signal selection for the MUX 401 of the first TX channel (MUX0_SEL), a selection for the MUX 401 of the second TX channel (MUX1_SEL), etc. At each step, the MUXs can select different signal combinations to stimulate the panel differently than in other steps. Panel scan logic 110 can control the timing of the steps by incrementing a step address stored in stimulation matrix RAM 337 through a connection via peripheral bus 349. Once the MUXs select the signals, the signals are sent to buffers 403 of the TX channel 405 to be transmitted to the panel sensor. It is noted that panel scan logic can also modify stim matrix 407 through peripheral bus 349, for example, to adjust the data entry values of the stim matrix, to replace the stim matrix with another stim matrix, etc.

Figure 5:
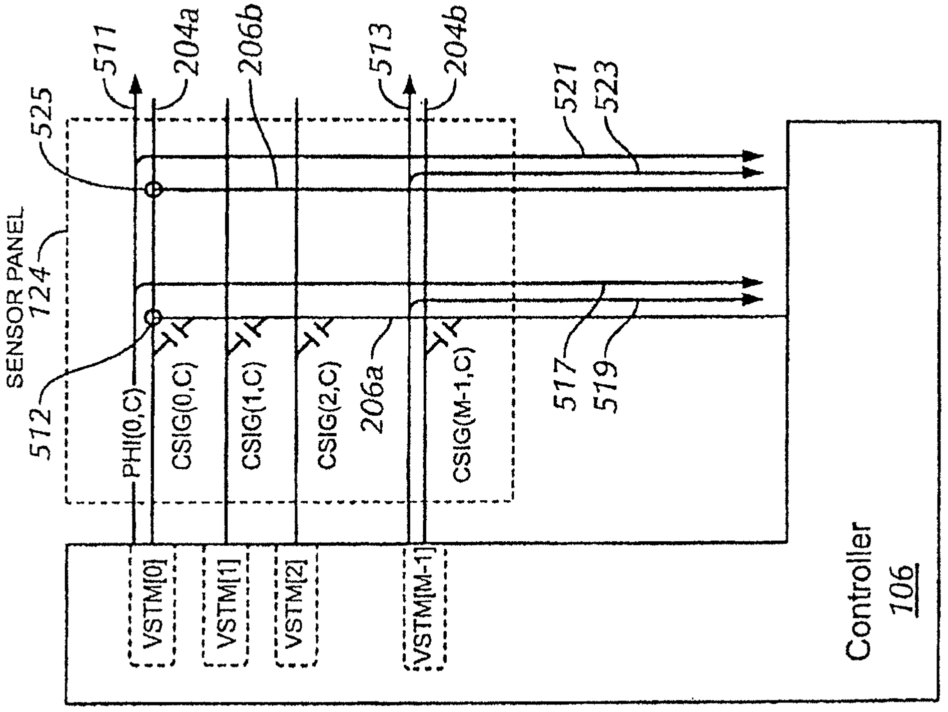
FIG. 5 illustrates an example stimulation of touch sensor panel according to embodiments of the invention.

FIG. 5 illustrates an example stimulation of touch sensor panel 124 according to embodiments of the invention. In particular, FIG. 5 illustrates signal paths of drive signals through rows 204 and sense signals through columns 206 of touch sensor panel 124. FIG. 5 shows touch controller 106 driving and sensor panel 124 during one step of a scan of the sensor panel. In FIG. 5, touch controller 106 is shown having M transmit channels 333 and N sense channels 501, which correspond to M drive lines (rows) 204 and N sense lines (columns), respectively, of sensor panel 124. Transmit channels 333 transmit drive signals Vstim[0], Vstim[1], . . . Vstim[M−1] through drive lines 204. Sense signals SenseSig[0], SenseSig[1], . . . SenseSig[N−1] are generated as a result of signal charges Qsig injected into the sense lines 206 of each pixel driven with Vstim, in proportion to the signal capacitances Csig of the pixels, as described above. Assuming a linear system, the total signal charge Qsig_tot injected into a sense line 206 is the sum of the signal charges injected at each pixel of the sense channel C:

$$Qsig\_tot_C = Qsig_C(0) + Qsig_C(1) + \ldots + Qsig_C(M-1) \tag{2}$$

where $Qsig_C(R)$ is the injected charge at the pixel corresponding to drive line R of sense channel C. Thus, referring to equation (1) above:

$$Qsig\_tot_C = Vstim(0)\times Csig_C(0) + Vstim(1)\times Csig_C(1) + \ldots Vstim(M-1)\times Csig_C(M-1) \tag{3}$$

At each step in a scan of sensor panel 124, a $Qsig\_tot_C$ is generated in each sense channel when drive lines 204 are driven with particular drive signals based on the MUX_SEL values in stim matrix 407 for that step. A complete scan of sensor panel 124 results in a plurality of $Qsig\_tot_C$ measurements, i.e., one $Qsig\_tot_C$ per channel per step. For a scan having P steps, equation (3) can be written as a series of equations, one equation for each step in the scan of sense channel C:

$$Qsig\_tot_C(S) = Vstim\times\cos(Pz\_stim_C(0,S))\times Csig_C(0) + Vstim\times\cos(Pz\_stim_C(1,S))\times Csig_C(1) + \ldots Vstim\times\cos(Pz\_stim_C((M-1),S))\times Csig_C(M-1) \tag{4}$$

where:

S=step index (from 0 to P−1)

C=channel index (from 0 to N−1)

$Qsig\_tot_C(S)$=Qsig_tot for sense channel C at step S $$Pz\_stim_C(R,S) = \begin{cases} 0^\circ \overset{if}{\to} Vstim(R,S) = Vstim+ \\ 180^\circ \overset{if}{\to} Vstim(R,S) = Vstim- \end{cases}$$

$$= \text{stimulation phase of } Vstim(R,S) \text{ for sense channel } C$$

$Csig_C(R)$=signal capacitance at the pixel corresponding to drive line R of sense channel C Equation (4) can be written in matrix form as:

$$\begin{bmatrix} Qsig\_tot_C(0) \\ Qsig\_tot_C(1) \\ Qsig\_tot_C(2) \\ \\ Qsig\_tot_C(P-1) \end{bmatrix} =$$

-continued $$Vstim\times\begin{bmatrix} M_C(0,0) & M_C(1,0) & \ldots & M_C(M-1,0) \\ M_C(0,1) & M_C(1,1) & & \\ M_C(0,2) & M_C(1,2) & & \\ \vdots & & \ldots & \\ \vdots & & & \vdots \\ M_C(0,P-1) & M_C(1,P-1) & & M_C(M-1,P-1) \end{bmatrix}\times\begin{bmatrix} Csig_C(0) \\ Csig_C(1) \\ Csig_C(2) \\ \\ Csig_C(M-1) \end{bmatrix}$$

where: $M_C(R,S)=\cos(Pz\_stim_C(R,S))$ or, in simplified form:

$$\tilde{Q}sig\_tot_e = Vstim\times\tilde{M}_C\times\tilde{C}sig_C \tag{5}$$

where: $\tilde{M}_C$=the phase matrix for sense channel C

The $Vstim\times\tilde{M}_C$ portion of equation (5) represents the selection of drive signals in stim matrix 407 in view of the particular processing methodology of the system. In particular, the entries in the phase matrix $\tilde{M}_C$ are the cosine values of the phases of the stimulation signals (cos(0°) for Vstim+ and)cos(180° for Vstim−). This representation accounts for the particular demodulation process used in the present example embodiment, which is described in more detail below with reference to FIG. 6. Although different sense channels have the same phase matrix in this example embodiment, in other embodiments, the phase matrix may vary from sense channel to sense channel.

Thus, by stimulating the pixels of a channel with different combinations of Vstim signals, each combination of Vstim signals defined by a row in stim matrix 407, and obtaining the total signal charges $Qsig\_tot_C$ from the sense signals resulting from the different stimulation combinations, for example, the signal capacitance $Csig_C$ at each pixel of the channel may be determined:

$$\tilde{C}sig_C = \frac{\tilde{M}_C^1}{Vstim}\times\tilde{Q}sig\_tot_C \tag{6}$$

where:

$$\frac{\tilde{M}_C^1}{Vstim} = \text{the decode matrix}$$

However, while the stimulation matrix (and by extension, $Vstim\times\tilde{M}_C$) represents the drive signals that are selected for each drive line for each step in a scan, the stimulation matrix might not reflect how the system is actually being stimulated once the drive signals are selected. In other words, the stimulation matrix may not capture other factors in the stimulation of pixels and the measurement of sense signals that may depend on the configuration and operation of the system. One example factor not taken into account by the stimulation matrix is variation in signal delay. FIG. 5, for example, illustrates that both the drive signals and the sense signals can have different signal path lengths in this particular example.

For the sake of clarity, FIG. 5 shows only drive signals 511 (Vstim[0]) and 513 (Vstim[M−1]), corresponding to drive lines 204*a* and 204*b* (the first and the last drive lines), and the resulting component signals 517 and 519 of sense signal SenseSig[0] generated on a sense line 206*a* and component signals 521 and 523 of sense signal SenseSig[1] generated on sense line 206*b* (the first and second sense lines). FIG. 5 illustrates that each sense signal is a composite signal formed by the superposition of multiple component signals generated at the sense line's pixels.

FIG. 5 illustrates that the length of a signal path from a transmit channel to a sense channel can be different depending on the particular drive line and sense line pair. For example, the signal path lengths of the component signals from the pixels to the receive channel can be different. In sense line 206*a*, for example, the path length of component signal 517 is longer than the path length of component signal 519. Likewise, in sense line 206*b*, the path length of component signal 521 is longer than the path length of component signal 523. In addition, the signal path lengths of the drive signals can vary by channel. For example, the path length from TransmitC[0] to pixel 512 of drive line 204*a* with sense line 206*a* is less than the path length from TransmitC[0] to a pixel 525 of drive line 204*a* with sense line 206*b*. For AC signals, for example, variations in the delays in the signals can cause the phases of the component signals to be different, which can be reflected in the superposition of the component signals forming the composite sense signal SenseSig used to obtain $Qsig\_tot_C$. Therefore, stimulation matrix 407 (and therefore, $Vstim \times \tilde{M}_C$) might not accurately reflect the how the sense signals are actually formed, e.g., because the stim matrix does not account for the signal delays in the system. Because the total signal charges $Qsig\_tot_C$ of equation (4) are obtained from the sense signals, the resulting phase matrix might not yield accurate results for the $Csig_C$ values. However, the phase components of equation (4) may be modified to compensate for factors such as variation in phase delay associated with, for example, a particular drive/sense line pair.

For example, a phase delay associated with the stimulation signal of each pixel in a channel can be added to the corresponding phase components of equation (4):

$$Qsig\_tot_C(S)=Vstim\times\cos(Pz\_stim_C(0,S)+\phi_C(0))\times Csig_C(0)+Vstim\times\cos(Pz\_stim_C(\mathbf{1},S)+0_C(1))\times Csig_C(1)+\ldots Vstim\times\cos(Pz\_stim_C((M-1),S)+\phi_C(M-1))\times Csig_C(M-1) \quad (7)$$

where: $\phi_C$ (R)=the phase delay associated with drive line R of sense channel C The modified phase components result is a compensated phase matrix for that channel:

$$\tilde{M}_{C\_comp} = \quad (8)$$

$$\begin{bmatrix} M_{C\_comp}(0,0) & M_{C\_comp}(1,0) & \ldots & M_{C\_comp}(M-1,0) \\ M_{C\_comp}(0,1) & M_{C\_comp}(1,1) & & \\ M_{C\_comp}(0,2) & M_{C\_comp}(1,2) & & \\ \vdots & & \ldots & \\ \vdots & & & \vdots \\ M_{C\_comp}(0,P-1) & M_{C\_comp}(1,P-1) & & M_{C\_comp}\begin{pmatrix} M-1, \\ P-1 \end{pmatrix} \end{bmatrix}$$

where: $M_{C\_comp}(R,S)=\cos(Pz\_stim_C(R,S)+\phi_C(R))$

The inverse of the compensated phase matrix is used as the decode matrix in equation (6):

$$\tilde{Csig}_C = \frac{\tilde{M}^{-1}_{C\_comp}}{Vstim} \times \tilde{Q}sig\_tot_C \quad (9)$$

The decode matrix $$\frac{\tilde{M}^{-1}_{C\_comp}}{Vstim}$$

can be stored in decode matrix RAM 321 and used along with $Qsig\_tot_C$ measurements obtained from the sense signals and stored in result memory 315 to determine $Csig_C$ values by calculating equation (9).

Figure 6:
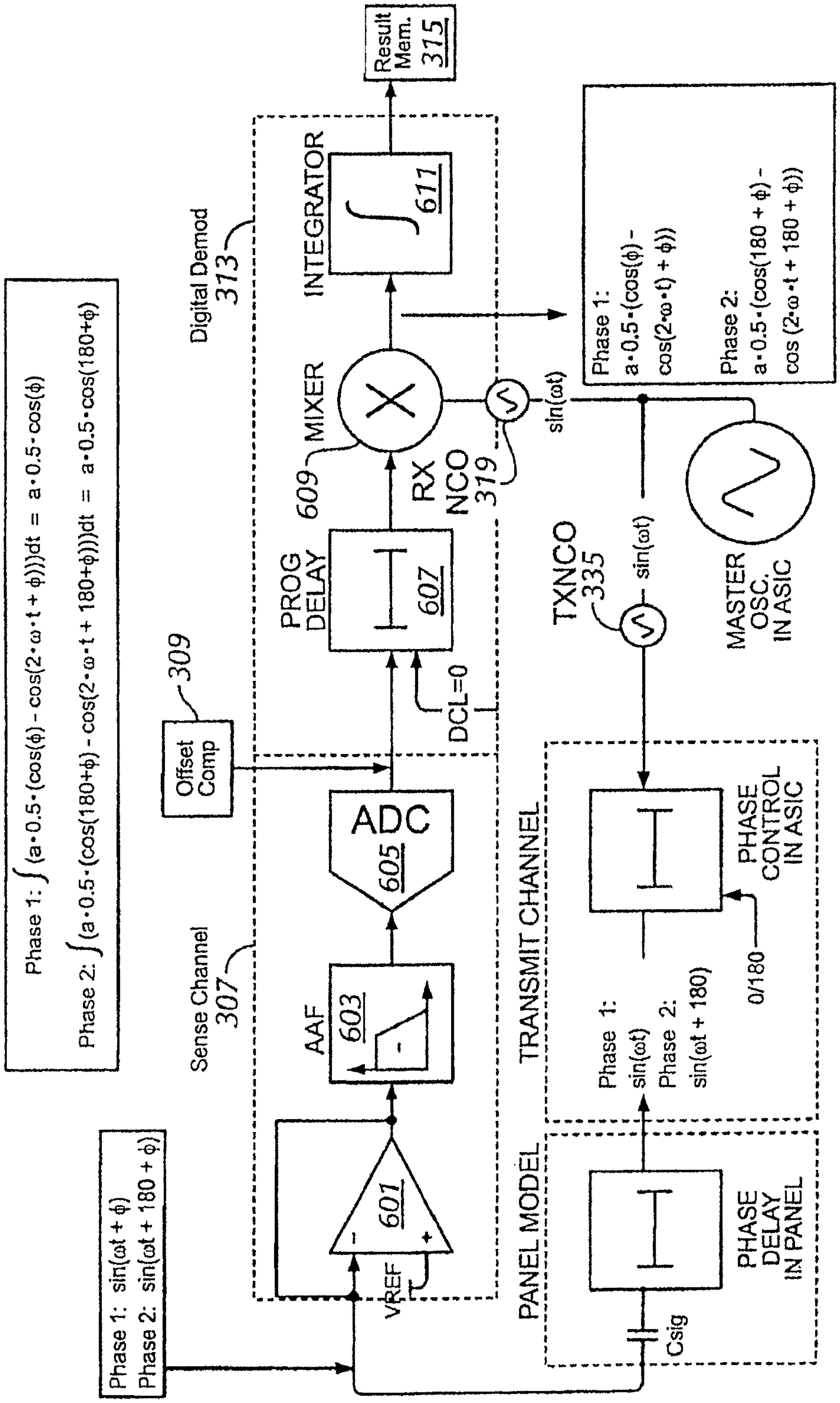
FIG. 6 illustrates an example sense channel and the first stage of the multi-stage vector demodulation engine according to embodiments of the invention.

An example process of obtaining $Csig_C$ values from the sense signals according to embodiments of the invention will now be described with reference to FIGS. 6-7. The example process implements a multi-stage demodulation/decode in which $Qsig\_tot_C$ measurements are obtained through a signal demodulation in one stage and a vector/matrix operation is performed in the 2nd stage to determine the $Csig_C$ values FIG. 6 illustrates details of one of the sense channels 307 and digital demodulation section 313 according to embodiments of the invention. As shown in FIG. 6, sense channel 307 includes a charge amplifier 601, an anti-alias filter (AAF) 603, and an analog-to-digital converter (ADC) 605. Digital demod section 313 includes a programmable delay 607, a mixer (signal multiplier) 609, and an integrator 611. In each step of the scan, amplifier 601 of sense channel 307 receives a composite signal charge as described in equation (7) along with a programmable offset charge. The charge amplifier 601 then converts the offset compensated composite signal charge into a voltage VSIG via feedback capacitor CFB such that the output of the pre-amplifier becomes: $Vsig_C=(Qsig\_tot_C-Qoff_C)/Cfbk_C$.

In some cases, the sense signal can be adjusted by offset compensator 309 prior to being input to amplifier 601. Adjusting the offset of the digital signal can reduce the dynamic range of some stimulation signals generated from highly variable stimulation matrices. In particular, some highly variable stimulation matrices may result in sense signals having a dynamic range greater than the dynamic input range of the charge amplifier 601, that is, the maximum signal magnitude that the amplifier can accept before the charge amplifier saturates. For example, in the case that the stimulation matrix is a Hadamard matrix, in one of the steps in the scan all of the channels are driven with stimulation signals having the same phase, and it is possible that all of the resulting component sense signals would add up to generate a composite sense signal with an amplitude that saturates amplifier 601. In this case, offset compensation would be used to subtract sufficient charge from the input charge as to prevent the charge amplifier from saturating. Offset compensation during a scan can be performed on-the-fly, that is, different offset compensation can be applied during different steps of the scan.

In another example embodiment, saturation of amplifier 601 may be mitigated by adjusting, for example, the feedback capacitance of the amplifier. In this case, individual sense channels could be adjusted, but the adjustment would remain the same for each step in a scan. This approach may be acceptable in the case that the stimulation matrix being used causes the same or similar imbalances of signals in the channels throughout the scan, and the amount of adjustment is not too great, e.g., up to a factor of 2. For example, using a circulant matrix as the stimulation matrix causes a fixed imbalance across all steps.

For the sake of clarity, the processing of a sense signal to obtain a value for Qsig_total is described below in reference to processing a single component of the sense signal of one sense channel (resulting from the stimulation of one of the channel's pixels) to obtain a single Qsig component of Qsig_total for that sense channel. However, it is understood that the analysis applies to all component signals, and that an actual Qsig_total result may be understood as simply a superposition of the individual Qsig results of the other component signals.

When a stimulation signal, Vstim, is applied to the drive line of a pixel, the AC portion of the stimulation signal, Vstim_AC(t), is coupled through to the sense line, generating a signal charge Qsig(t) that tracks Vstim_AC(t) with an amplitude proportional to the signal capacitance Csig of the pixel. From equation (1) above:

$$Qsig(t)=Csig\times Vstim\_AC(t) \quad (10)$$

The feedback capacitance in the feedback path of the charge amplifier 601 converts the injected signal charge into an output voltage relative to the reference voltage of VREF of the charge amplifier $$V_{amp\_out}(t)=\frac{Qsig(t)}{C_f} \quad (11)$$

Substituting for Qsig(t) using equation (10) yields:

$$V_{amp\_out}(t)=\frac{Csig}{C_f}\times \text{Vstim\_AC}(t) \quad (12)$$

Thus, charge amplifier 601 outputs a signal whose amplitude is the stimulus amplitude Vamp_out(t) scaled by the gain (Csig/Cf) of the charge amplifier. In more general terms, sensor panel 124 adds an amplitude modulation to the drive signal, the amplitude modulation carrying information about something to be sensed, e.g. the a finger, water level, etc.

The output of charge amplifier 601 is fed into AAF 603. AAF 603 can attenuate noise components above the nyquist sampling limit of the ADC sufficiently to prevent those components from aliasing back into the operating frequency range of the multi-touch controller. Furthermore, AAF 603 can attenuate any noise outside the frequency operating range of the multi-touch controller and therefore helps to improve the Signal-to-Noise ratio. It also can be important to properly select the sampling clock FCLK_DAC of the TX DAC. Generating a signal of frequency FSTM at the TX DAC clock rate will introduce images in the spectrum of the TX DAC output signal at n*FCLK_DAC+/−FSTM whereas N=1, 2 . . . , to infinity. The images will appear in the composite signal entering the receive channel. Upon sampling the composite signal with the ADC in the receive channel, those images will be folded around the sampling frequency FCLK_ADC at which the ADC samples the composite touch signal. The output of the ADC therefore has the following frequency components: N*(FCLK_DAC+/−FCLK_ADC)+/−FSTM. If the DAC and ADC clock rate FCLK_DAC and FCLK_ADC, respectively, are the same frequency, these images appear in the pass-band. In the above example, one possible frequency component would be (FCLK_DAC −FCLK_ADC)+FSTM=FSTM and therefore would appear as a undesirable in band component which would lead to reduced SNR and therefore reduced touch performance Therefore, it is beneficial to select a TX DAC sampling frequency FCLK_DAC that is different from the ADC sampling rate. This can prevent the images from folding back into the pass-band. In one embodiment, FCLK_DAC can be twice of the ADC clock rate FCLK_ADC. The two clock sources should be correlated, i.e. based on the same master clock. It can be beneficial to make the DAC sampling clock higher in frequency than the ADC sampling clock as DACs can consume less power than the power consumed by all ADCs combined for the same increase in sampling clock frequency.

The output of AAF 603 is converted by ADC 605 into a digital signal, which is sent from sense channel 307 to digital demodulation section 313. Digital demodulation section 313 demodulates the digital signal received from sense channel 307 using a homodyne mixing process in which the signal is multiplied with a demodulation signal of the same frequency. In order to increase the efficiency of the mixing process, it may be desirable to adjust the phase of the sense channel output signal to match the phase of the demodulation signal. Stimulating a pixel of sensor panel 124 with Vstim+ and processing the resulting sense signal as described above would result in the following output from sense channel 307:

$$V_{sense\_ch\_outV+}(t)=\frac{Csig}{C_f}\times V_0\sin(\omega t+\theta) \quad (13)$$

where:

$V_0$=the amplitude of the AC portion of Vstim=2.25V

θ=the relative phase delay between the signal output of ADC 605 and the demodulation signal for a given sense channel For stimulation with Vstim-, the resulting output from ADC 605 would be:

$$V_{sense\_ch\_outV-}(t)=\frac{Csig}{C_f}\times V_0\sin(\omega t+180^\circ+\theta) \quad (14)$$

The relative phase delay θ can be an aggregate of delays caused by various elements of the system, such as the geometry of the signal paths, the operation of the output buffers, etc. In general, the various delays in the system can be separated into two categories, delays that apply equally to all drive lines of a sense channel, referred to as global delays herein, and delays that vary among the drive lines of the sense channel, referred to as individual line delays herein. In other words, global delays affect all component signals of the composite sense signal equally, while individual line delays results in different amounts of delay for different component signals. The relative phase delay can be represented as:

$$\theta=DCL+\phi(R) \quad (15)$$

where:

DCL=the sum of all global delays (referred to herein as the composite global delay) affecting a sense channel ϕ(R)=the individual line delay associated with drive line R of a sense channel Substituting equation (15) into equations (13) and (14) yields:

$$V_{sense\_ch\_outV+}(t) = \frac{Csig}{C_f} \times V_0 \sin(\omega t + DCL + \phi(R)) \quad (16)$$

$$V_{sense\_ch\_outV-}(t) = \frac{Csig}{C_f} \times V_0 \sin(\omega t + 180° + DCL + \phi(R)) \quad (17)$$

Since the global delays affect all of the component signals of the sense signal equally, once the composite global delay DCL has been determined for a channel, the global portion of the phase delay of sense channel output signal can be removed by programmable delay 607, yielding:

$$V_{mixer\_inV+}(t) = \frac{Csig}{C_f} \times V_0 \sin(\omega t + \phi(R)) \quad (18)$$

$$V_{mixer\_inV-}(t) = \frac{Csig}{C_f} \times V_0 \sin(\omega t + 180° + \phi(R)) \quad (19)$$

as the signals corresponding to Vstim+ and Vstim−, respectively, that are input into mixer 609.

Since the individual line delays are different for different signal components of the sense signal, the individual line delays cannot be removed from the sense signal simply by using a single phase adjustment to the composite sense signal, such as the phase adjustment made by programmable delay 607. However, the individual line delays may be accounted for by the compensated phase matrix $\tilde{M}_{comp}^{-1}$, which is described in more detail below.

The phase-adjusted signal is sent from programmable delay 607 to mixer 609. Mixer 609 multiplies the phase-adjusted signal with a demodulation signal, $$V_{demod} = \sin(\omega t), \quad (20)$$

which is generated by RX NCO 319 based on a master oscillator 615. It is noted that the mixing is performed using digital signals. This can provide higher resolution than in some previous designs, which can result in improved suppression of noise.

The resulting demodulated signal output from mixer 609 as:

$$V_{mixer\_outV+}(t) = \frac{1}{2} \times \frac{Csig}{C_f} \times V_0 \times \begin{pmatrix} \cos(\phi(R)) - \\ \cos(2\omega t + \phi(R)) \end{pmatrix} \quad (21)$$

$$V_{mixer\_outV-}(t) = \frac{1}{2} \times \frac{Csig}{C_f} \times V_0 \times \begin{pmatrix} \cos(180° + \phi(R)) - \\ \cos(2\omega t + 180° + \phi(R)) \end{pmatrix} \quad (22)$$

The mixer output is integrated by integrator 611, yielding:

$$V_{int\_outV+} = \frac{1}{2} \times \frac{Csig}{C_f} \times V_0 \times \cos(\phi(R)) \quad (23)$$

$$V_{int\_outV-} = \frac{1}{2} \times \frac{Csig}{C_f} \times V_0 \times \cos(180° + \phi(R)) \quad (24)$$

Since the integrator has essentially a low pass response, the high frequency component cos(2ωt+180°+ϕ(R)) is eliminated leaving only the DC component.

Scaling of the results in integrator 611 by a factor of $2C_f$ results in output signals:

$$V_{int\_scaledV+} = V_0 \times \cos(\phi(R)) \times Csig, \text{ if } Vstim(R) = Vstim+ \quad (25)$$

$$V_{int\_scaledV-} = V_0 \times \cos(180°) + \phi(R)) \times Csig, \text{ if } Vstim(R) = Vstim- \quad (26)$$

from integrator 611. In each step S in a scan of sensor panel 124, drive lines 204 are driven with either Vstim+ or Vstim− drive signals based on the MUX_SEL values in stim matrix 407 for that step, each stimulation signal generating a component output (25) or (26) of integrator 611 for each sense channel. Thus, for a channel C, the output of integrator 611 is a linear combination of corresponding components (25) and (26):

$$V_{int\_scaled\_tot\_C}(S) = V_0 \times W_C(0,S) \times Csig(0) + V_0 \times W_C(1,S) \times Csig(1) + \ldots V_0 \times W_C(M-1,S) \times Csig(M-1) \quad (27)$$

where:

$$W_C(R, S) = \begin{cases} \cos(\phi_C(R)) \overset{if}{\rightarrow} Vstim(R, S) = Vstim+ \\ \cos(180° + \phi_C(R)) \overset{if}{\rightarrow} Vstim(R, S) = Vstim- \end{cases}$$

The right hand side of equation (27) is the same as the right hand side of equation (7), with $V_0$ equal to the amplitude, Vstim, of the stimulation signals and $W_C$(R,S) equal to the components of the compensated phase matrix $\tilde{M}_{C\_comp}$. Therefore, the output voltage of integrator 611, $V_{int\_scaled\_tot\_C}$(S), at each step is simply the composite signal charge Qsig_tot$_C$(S).

The Qsig_tot$_C$ values output by a channel's integrator 611 are posted to result memory 315, forming a Qsig_tot$_C$ vector:

$$Qsig\_tot_C(S) = \begin{bmatrix} Qsig\_tot_C(0) \\ Qsig\_tot_C(1) \\ Qsig\_tot_C(2) \\ \\ \\ Qsig\_tot_C(P-1) \end{bmatrix} \quad (28)$$

that is used in a decoding operation to determine the Csig values for that channel. An example vector decode operation according to embodiments of the invention will now be described. Referring to FIG. 3, vector operator 317 reads the Qsig_tot$_C$ vector from memory 315 and reads the decode matrix $$\frac{\tilde{M}_{C\_comp}^{-1}}{Vstim}$$

from decode matrix RAM 321. Vector operator 317 then performs vector multiplication of the Qsig_tot$_C$ vector and the decode matrix $$\frac{\tilde{M}_{C\_comp}^{-1}}{Vstim}$$

according to equation (9) to obtain the $Csig_C$ vector for channel C:

$$\tilde{C}sig_C = \begin{bmatrix} Csig_C(0) \\ Csig_C(1) \\ Csig_C(2) \\ \\ \\ Csig_C(M-1) \end{bmatrix} \quad (29)$$

The $Csig_C$ vector is posted to result RAM 323, where it can be read by other systems, such as processor subsystem 102, host processor 128, etc., for sensing touch by comparing the $Csig_C$ vector components with known, static (no touch) values for Csig, for example.

Figure 7:
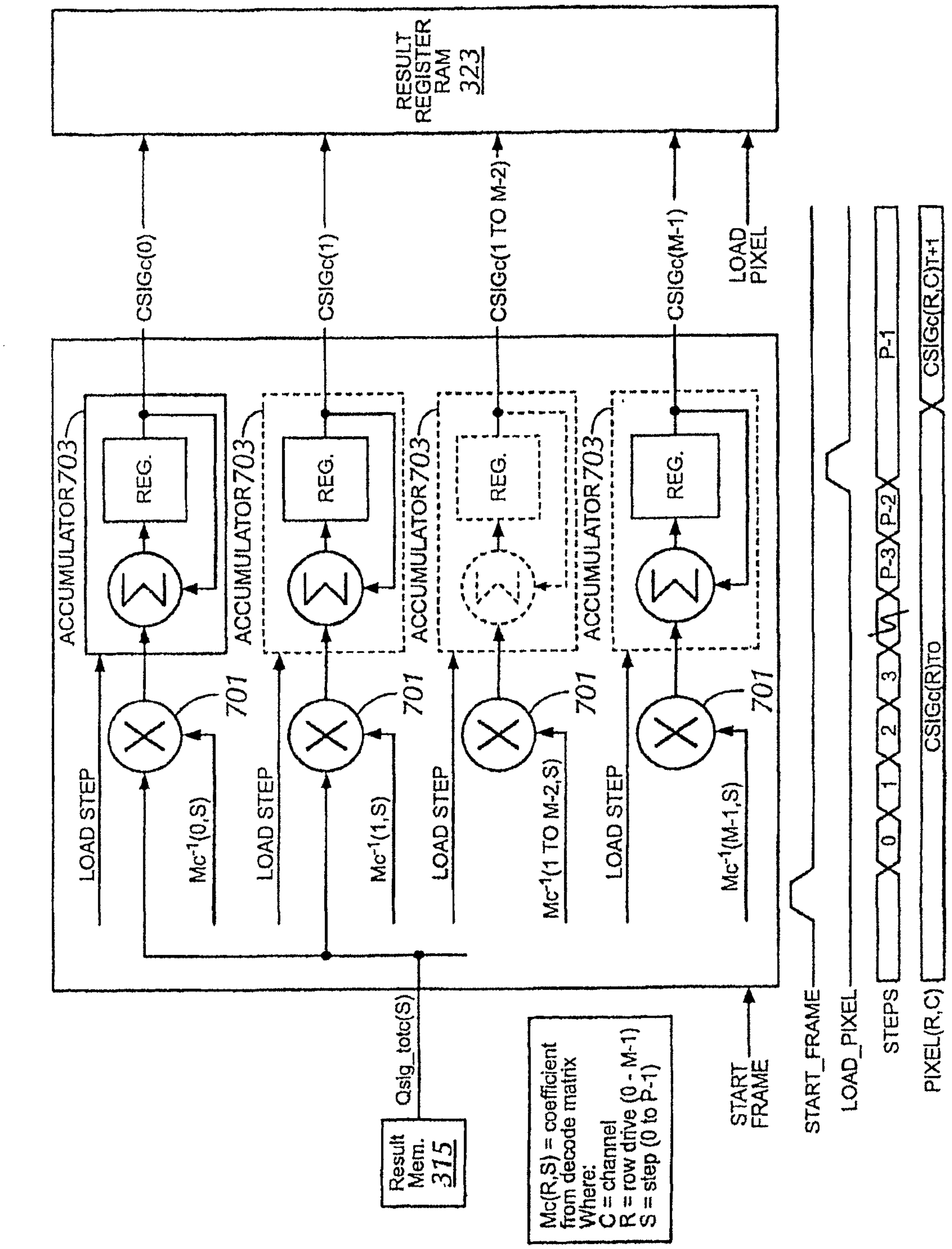
FIG. 7 illustrates an example second stage of the multi-stage vector demodulation engine according to embodiments of the invention.

FIG. 7 shows the 2nd stage of the multi-stage vector demodulation engine 109. Upon assertion of signal START_FRAME, the vector demodulation engine, step counter and registers are reset. After the first step multipliers 701 (one for each drive line, 0 to M−1) multiply the digital representation of $Qsig\_tot_C$ available at the output of integrator 611 and stored in result memory 315 with a corresponding decode matrix coefficient stored in $\tilde{M}_{C\_comp}{}^{-1}$, for step 0, and the result is accumulated in accumulators 703 (1 to 16), respectively, after assertion of signal LOAD_STEP. After the 2nd step, multipliers 701 (0 to M−1) multiply the digital representation of $Qsig\_tot_C$ available at the output of integrator 611 with a decode matrix coefficient $\tilde{M}_{C\_comp}{}^{-1}$, for step 1 and the result is accumulated in accumulators 703 (1 to 16), respectively, after assertion of signal LOAD_STEP. This process is repeated until the data for the last step P have been processed, at which time the accumulated data in accumulators 1 to 16, which are now representative of pixel data $Csig_C$, are stored in the result register RAM 323 after assertion of signal LOAD_PIXEL. Note that signal LOAD_STEP also resets the first stage of the multi-stage vector demodulation engine 109 at the end of a given step in preparation for processing the composite data of the next step. The 2nd stage of the multi-stage vector demodulation engine essentially performs the operation in equation (9). Multipliers 701 (1-16) and accumulators 703 (1-16) need not be implemented as separate multipliers, but can be implemented with a single multiplier and accumulator that can be shared (i.e. time multiplexed) between multiple channels. An example of this is described in U.S. patent application Ser. No. 12/208,303, titled "ADVANCED RECEIVE CHANNEL ARCHITECTURE" by Thomas Wilson, which is being filed on the same day as the present application, and the contents of which is incorporated herein by reference in entirety for all purposes.

Implementing a multi-stage vector demodulation such as the in the present example may provide a more flexible system than conventional designs. For example, the vector operation can allow for selection and testing of arbitrary vectors, allowing system designers to test and implement different stimulation matrix/decode matrix combinations, for example, without the need to extensive redesign of the sensing system. Likewise, use of a vector operation stage may allow the sensing system to use matrices that are not easily invertible. For example, a Hadamard stimulation matrix containing 0s, 1s, and −1s only (in order to stimulate with a single frequency of phase 0° or 180°) has an inverse that contains just 0s, 1s, and −1s. However, the inverse of a circulant matrix, for example, contains fractional numbers. The current implementation, using matrix decode, allows the use of matrices such as a circulant matrix. In another potential benefit, scaling a system may be easier to accomplish. For example, in the case that the drivers on a chip are not uniform (e.g., in a case that the manufacturing process for the chip does not produce uniform drivers), the channels may be more easily scaled to reduce or correct the mismatch.

Referring to FIG. 3, an example optional feature according to embodiments of the invention will now be described. FIG. 3 illustrates that, in addition to receiving sense signals from sense channels 307, digital demod section 313 also can receive signals from other channels, such as miscellaneous channels 305 (see FIG. 3), which may include signals from e.g., sensor 111 (see FIG. 1). Sensor 111 can be, e.g., infrared sensors, temperature sensors, ambient light sensors, proximity sensors, etc. These miscellaneous channel signals may be used, for example, to calibrate the system, for example, during the demod/decode process, to display information, for additional sensing, for far field detection, etc. The miscellaneous channel signals may be demodulated and/or decoded similar to the sense signals, described above.

Figure 8:
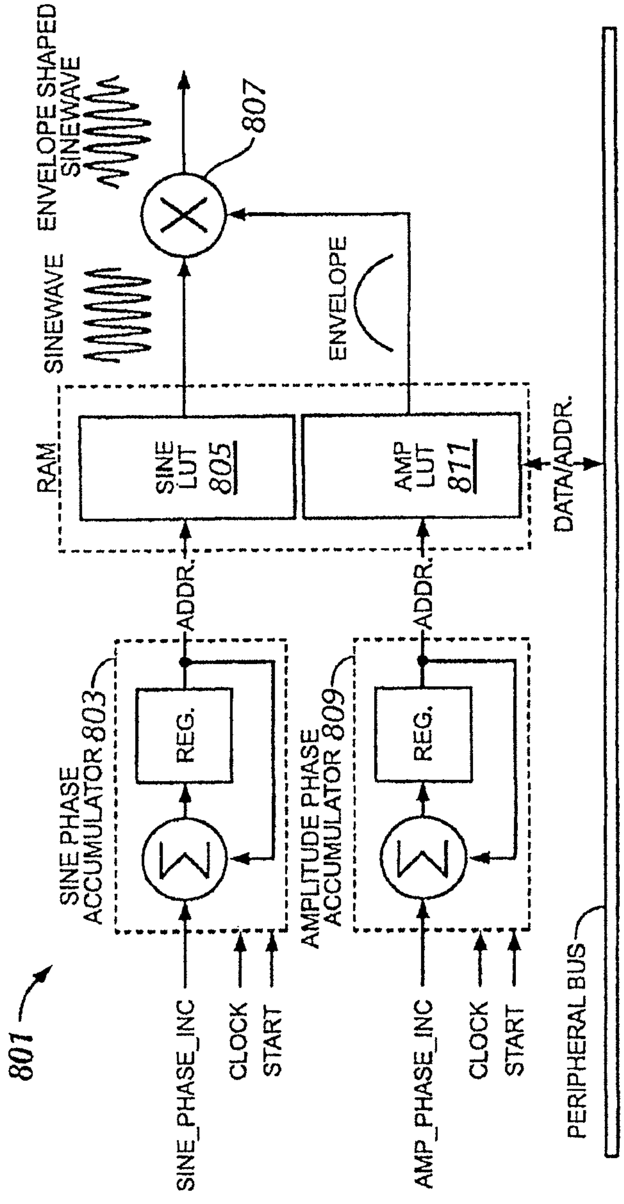
FIG. 8 illustrates an example receive NCO according to embodiments of the invention.

FIG. 8 illustrates an example receive NCO 801 according to embodiments of the invention. The RX NCO is comprised of a sine phase accumulator 803, sine lookup table 805, mixer 807, amplitude phase accumulator 809 and amplitude lookup table 811. The programmable phase increment sine_phase_inc determines the frequency of the demodulation waveform. The phase accumulator 803 accumulates the sine phase increment sine_phase_inc. The output of the sine phase accumulator 803 represents an address into the sine lookup table 805. The synthesized waveform out of the sine lookup table 805 has a constant amplitude which then is envelope shaped by multiplying it with the envelope. The envelope shape is stored in an amplitude table 811 and is retrieved from the amplitude LUT at a rate set by the amplitude phase increment amp_phase_inc. Similarly to the sine phase increment, the amplitude phase increment amp_phase_inc is accumulated by an amplitude phase accumulator 809. The output of the amplitude phase accumulator 809 represents an address into the amplitude RAM. For example, the sine lookup table 805 may store 2048 coefficients, representing exactly one sine-wave cycle. The sine phase increment may be a 16 bit number, i.e. the phase accumulator 809 is also 16 bits. Since the sine lookup table 805 stores 2048 coefficients, representing an address space of 11 bits, only the upper 11 bits out of the sine phase accumulator 809 would be passed into the address port of the sine lookup table. Assuming that the demodulation waveform is generated at the ADC clock rate, FCLK_ADC, the phase increment for a given stimulus frequency FSTM may be phase_inc=2^16*FSTM/FCLK_ADC. The benefit of having envelope shaping is that the spectral properties of the passband of the demodulation can be precisely controlled. The frequency response of the demodulation is essentially the convolution of the time domain representation of the envelope and the sine wave out of the sine lookup table 805. For example, for a rectangular window the frequency domain representation the demodulation would be a single frequency component convoluted with the time domain representation of the rectangular window (sinc function sin(x)/x). By using appropriate window functions such as Chebychev or Gaussian windows, the passband response can be optimized to fit a given application. The TX NCO may be constructed in a similar fashion and may or may not feature envelope shaping.

In addition to stimulating scanning touch sensor panel 124 to detect touch events, touch controller 106 can perform other functions. For example, controller 106 can perform a spectrum analyzer function prior to actively scanning panel 124 for touch detection. In a spectrum analyzer function, controller 106 drives panel 124 with drive signals of different frequencies in order to determine one or more frequencies that have the lowest noise. The low-noise frequency or frequencies can then be used to drive panel 124 during the active scanning phase. An example spectrum analyzer function is disclosed in U.S. patent application Ser. No. 12/208,334, titled "SINGLE-CHIP TOUCH CONTROLLER WITH INTEGRATED DRIVE SYSTEM" by Christoph Horst Krah, Steve Porter Hotelling, Marduke Yousefpor and Tom Wilson, which is being filed on the same day as the present application, and which is a Continuation-In-Part (CIP) application of U.S. patent application Ser. No. 11/818,345, filed Jun. 13, 2007, the contents of both applications are incorporated herein by reference in entirety for all purposes.

Figure 9A:
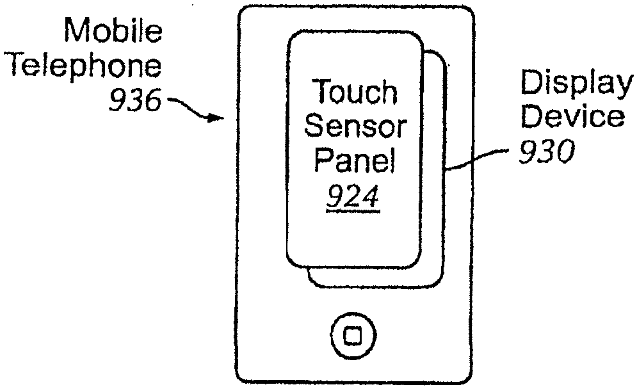
FIG. 9*a* illustrates an example mobile telephone having a touch sensor panel including a single-chip multi-stimulus controller according to embodiments of the invention.

FIG. 9*a* illustrates example mobile telephone 936 that can include touch sensor panel 924 and display device 930, the touch sensor panel including a single-chip multi-stimulus controller according to embodiments of the invention.

Figure 9B:
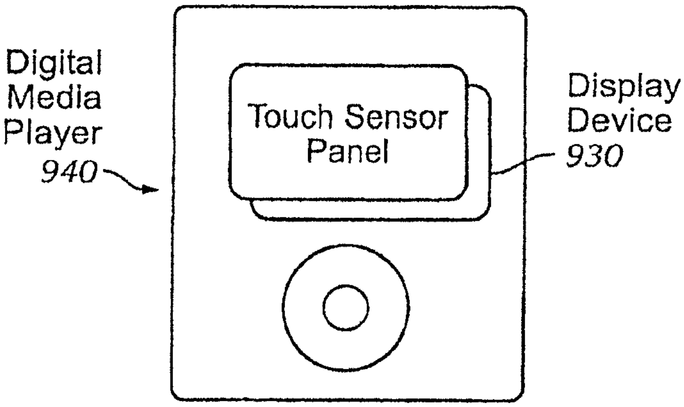
FIG. 9*b* illustrates an example digital media player having a touch sensor panel including a single-chip multi-stimulus controller according to embodiments of the invention.

FIG. 9*b* illustrates example digital media player 940 that can include touch sensor panel 924 and display device 930, the touch sensor panel including a single-chip multi-stimulus controller according to embodiments of the invention.

Figure 9C:
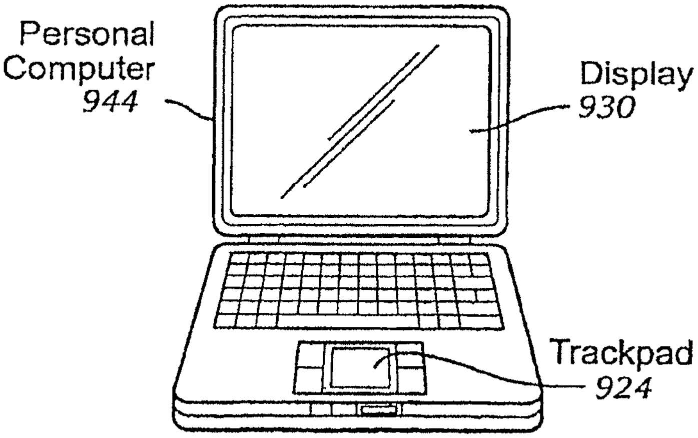
FIG. 9*c* illustrates an example personal computer having a touch sensor panel (trackpad) and/or display including a single-chip multi-stimulus controller according to embodiments of the invention.

FIG. 9*c* illustrates example personal computer 944 that can include touch sensor panel (trackpad) 924 and display 930, the touch sensor panel and/or display of the personal computer (in embodiments where the display is part of a touch screen) including a single-chip multi-stimulus controller according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An apparatus for decoding a plurality of sense signals, the apparatus comprising:
- demodulation circuitry configured for mixing each sense signal with a demodulation signal to obtain a set of composite measurements, each sense signal being formed of a plurality of component signals resulting from driving a sensor with a combination of simultaneous drive signals; and
- processing circuitry configured for processing the set of composite measurements to obtain measurement data carried by the component signals, wherein processing the set of composite measurements comprises decoding the set of composite measurements to derive the measurement data carried by the component signals, wherein the decoding is based on a plurality of values used to generate the simultaneous drive signals.

2. The apparatus of claim 1, wherein processing the set of composite measurements comprises decoding the set of composite measurements based on a second plurality of values, the second plurality of values based on an inverse of the plurality of values used to generate the simultaneous drive signals.

3. The apparatus of claim 2, wherein the second plurality of values includes adjustments to compensate for differences in phase delays among the component signals.

4. The apparatus of claim 1, further comprising:
- an oscillator configured to output the demodulation signal to the demodulation circuitry.

5. The apparatus of claim 4, wherein the oscillator forms the demodulation signal by generating a periodic waveform and mixing the periodic waveform with an envelope waveform.

6. The apparatus of claim 1, wherein the demodulation circuitry is further configured for applying a programmable delay to each sense signal to match a phase of the demodulation signal.

7. The apparatus of claim 1, wherein the demodulation circuitry is further configured for integrating an output from the mixing of each sense signal with the demodulation signal to obtain the set of composite measurements.

8. The apparatus of claim 1, wherein the set of composite measurements are stored in a first memory.

9. The apparatus of claim 8, wherein the processing circuitry is further configured to read the set of composite measurements from the first memory.

10. The apparatus of claim 1, wherein the mixing of each sense signal with the demodulation signal is performed using digital signals.

11. The apparatus of claim 1, wherein the measurement data are stored in a second memory.

12. The apparatus of claim 1, wherein the component signals are signal charges injected into a sense line by the drive signals.

13. The apparatus of claim 1, wherein the drive signals include drive signals that are the same frequency and 180 degrees out of phase.

14. A method for demodulating and decoding sense signals, the method comprising:
- mixing each sense signal with a demodulation signal to obtain a set of composite measurements, each sense signal being formed of a plurality of component signals resulting from driving a sensor with a combination of simultaneous drive signals; and
- processing the set of composite measurements to obtain measurement data carried by the component signals, wherein processing the set of composite measurements comprises decoding the set of composite measurements to derive the measurement data carried by the component signals, wherein the decoding is based on a plurality of values used to generate the simultaneous drive signals.

15. The method of claim 14, wherein processing the set of composite measurements comprises decoding the set of composite measurements based on a second plurality of values, the second plurality of values based on an inverse of the plurality of values used to generate the simultaneous drive signals.

16. The method of claim 15, wherein the second plurality of values includes adjustments to compensate for differences in phase delays among the component signals.

17. The method of claim 14, wherein the demodulation signal is formed by generating a periodic waveform and mixing the periodic waveform with an envelope waveform.

18. The method of claim 14, further comprising applying a programmable delay to each sense signal to match a phase of the demodulation signal.

19. The method of claim 14, further comprising integrating an output from the mixing of each sense signal with the demodulation signal to obtain the set of composite measurements.

20. The method of claim 14, wherein the drive signals include drive signals that are the same frequency and 180 degrees out of phase.

* * * * *